(12) United States Patent
Wolfson et al.

(10) Patent No.: US 10,802,919 B1
(45) Date of Patent: Oct. 13, 2020

(54) METHODS AND APPARATUS FOR CONSISTENCY GROUP REPLICATION WITH REDUCED RESOURCE CONSUMPTION

(71) Applicant: EMC IP Holding Company LLC, Hopkinton, MA (US)

(72) Inventors: Kfir Wolfson, Beer Sheva (IL); Alexandra Solan, Tel Aviv (IL); Jehuda Shemer, Kfar Saba (IL); Slavik Neymer, Tel Aviv (IL); Valerie Lotosh, Ramat Gan (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 15/395,124

(22) Filed: Dec. 30, 2016

(51) Int. Cl.
*G06F 11/14* (2006.01)
*G06F 16/11* (2019.01)

(52) U.S. Cl.
CPC ........ *G06F 11/1446* (2013.01); *G06F 16/128* (2019.01); *G06F 2201/84* (2013.01)

(58) Field of Classification Search
CPC ........... G06F 11/1446; G06F 17/30088; G06F 2201/84; G06F 11/14; G06F 16/11
See application file for complete search history.

(56) References Cited

U.S. PATENT DOCUMENTS

| 8,806,161 B1* | 8/2014 | Natanzon | G06F 3/065 707/655 |
| 9,031,913 B1* | 5/2015 | Natanzon | G06F 17/30212 707/648 |
| 9,063,994 B1* | 6/2015 | Natanzon | G06F 17/30575 |
| 9,189,339 B1* | 11/2015 | Cohen | G06F 11/1412 |
| 9,251,114 B1* | 2/2016 | Ancin | G06F 15/17331 |
| 2012/0221525 A1* | 8/2012 | Gold | G06F 11/1458 707/644 |
| 2014/0279912 A1* | 9/2014 | Anglin | G06F 11/1448 707/640 |

* cited by examiner

Primary Examiner — Tarek Chbouki
Assistant Examiner — Maher N Algibhah
(74) Attorney, Agent, or Firm — Ryan, Mason & Lewis, LLP (57) ABSTRACT

Methods and apparatus are provided for consistency group replication with reduced resource consumption. An exemplary method comprises: obtaining, by one or more first replication appliances at a first location, one of (i) data generated by a monitored application; and (ii) metadata for each write operation generated by the monitored application, wherein a splitter function provides the data or metadata to the one or more first replication appliances based on a dynamic determination of whether the monitored application requires replication based on the data or the metadata based on predefined application consistency group type criteria; obtaining, by one or more of the first replication appliances, a snapshot comprising the data associated with each of the write operations since a prior snapshot based on the one of the data and the corresponding metadata; and providing the snapshot to one or more second replication appliances at a different location for storage in a replication journal.

20 Claims, 6 Drawing Sheets

METHODS AND APPARATUS FOR CONSISTENCY GROUP REPLICATION WITH REDUCED RESOURCE CONSUMPTION

FIELD

The field relates generally to replication of monitored applications.

BACKGROUND

Two different approaches are typically used in replication solutions, namely, continuous replication and snapshot-based replication. In continuous replication, a constant stream of production I/Os (input/output operations) is forwarded to a replication appliance, allowing the user to later access any-point-in-time images of the production data, including synchronous replication options. This type of replication consumes resources on the replication appliances, both on production and replica sites, and also generates constant traffic loads. While this approach is necessary for business-critical applications, a lower granularity protection can suffice for less important applications. For these cases, it is common to use snapshot-based replication.

Snapshot-based replication takes periodic snapshots of the production data, and the user will be limited to these snapshots when accessing data history. In the past, a full backup of the snapshot was transferred to the replica site, but modern snapshot-based replication solutions transfer only the data that has been changed since the previous snapshot. One available implementation exploits the underlying storage or hypervisor infrastructure for snapshots and differences between snapshots. This approach consumes resources of the infrastructure instead of the replication appliance.

SUMMARY

Illustrative embodiments of the present disclosure provide methods and apparatus for consistency group replication with reduced resource consumption. In one exemplary embodiment of the disclosure, a method comprises the steps of obtaining, by one or more first replication appliances at a first location, one of (i) data generated by a monitored application; and (ii) metadata for each write operation generated by the monitored application, wherein a splitter function provides the data or metadata to the one or more first replication appliances based on a dynamic determination of whether the monitored application requires replication based on the data or the metadata based on predefined application consistency group type criteria; obtaining, by one or more of the first replication appliances, a snapshot comprising the data associated with each of the write operations since a prior snapshot based on the one of the data and the corresponding metadata; and providing the snapshot to one or more second replication appliances at a different location than the first location for storage in a replication journal.

Advantageously, illustrative embodiments of the disclosure provide improved techniques for replicating applications. These and other features and advantages of the present invention will become more readily apparent from the accompanying drawings and the following detailed description.

DETAILED DESCRIPTION

Illustrative embodiments of the present disclosure will be described herein with reference to exemplary communication, storage and processing devices. It is to be appreciated, however, that the invention is not restricted to use with the particular illustrative configurations shown. In certain embodiments, the current disclosure may provide methods and apparatus for consistency group replication with reduced resource consumption. In certain embodiments, a consistency group may comprise a set of storage volumes associated with an application that is managed as a consistent entity. In certain embodiments, if the application is run on one or more virtual machines, then the CG may also contain these virtual machine configurations. For example in some embodiments, the storage volumes for the various virtual machines of a particular application typically may be managed as a consistency group. While the exemplary embodiments of the disclosure are primarily described herein using a consistency group comprising a plurality of virtual machines of a given application, aspects of the present invention can be applied to a consistency group comprising multiple storage units of a given application, as would be apparent to a person of ordinary skill in the art based on the present disclosure.

In some embodiments, some of the replication techniques may be applied for replication of storage LUNs (logical unit numbers) of an application and replication of virtual machines of an application. In certain embodiments, for replication of storage units (or "Storage LUNs"), an application can span multiple storage units. Typically, a consistency group will comprise all of the storage units of the application. Thus, in certain embodiments, bookmarks and snapshots are taken across the storage units at the same time. In certain embodiments, when restoring a consistency group, restoration is performed on all storage units together. In some embodiments, with replication of virtual machines, an application may comprise one or more virtual machines. In some embodiments, each virtual machine can have one or more hard disks. Typically, a consistency group will comprise all of the virtual machines of the application.

In one or more embodiments of the disclosure, techniques are provided for consistency group (CG) replication with reduced resource consumption. In at least one embodiment of the disclosure, the disclosed application replication techniques optionally generate limited-specification consistency groups, referred to herein as "Mini-CGs". In one exemplary implementation, a splitter function provides either the data or the metadata generated by a monitored application to at least one replication appliance at a first location, based on a dynamic determination of whether the monitored application requires a full consistency group replication or a mini-CG replication, based on predefined application consistency group type criteria and ongoing metrics from the consistency group. In some embodiments, the predefined application consistency group type criteria may comprise, for example, user-defined policies, user-defined application priorities, resource availability, consistency group performance and/or a consistency group data change rate (for example, by measuring an amount of data changed between two snapshots, as the number of dirty blocks, optionally taking into account "data folding," discussed below in conjunction with FIG. 2). Typically, smaller sized applications with smaller data change rates are suitable candidates for mini-CG replication, but other heuristics can be employed, including manual policies defined by the user, as would be apparent to a person of ordinary skill in the art. For example, in some embodiments the predefined application consistency group type criteria may specify that if the data change rate of a CG is lower than a predefined value, then the CG can be replicated as a mini-CG. Thus, one or more embodiments of the disclosure substantially constantly and/or periodically monitor the data change rate to determine if the criteria is met.

In some embodiments, the disclosed application replication system may automatically identify "less important" applications, suitable for mini-CG replication; and a given consistency group can automatically move between "full CG" and "mini-CG" modes. An exemplary dynamic application classification process 400 is discussed further below, in conjunction with FIG. 4, to automatically and dynamically classify a given application as requiring full CG replication or mini-CG replication. In certain embodiments, mini-CGs may consume less resources in both management and data-path aspects. In certain embodiments, the cost of mini-CGs may compromise recovery time objective (RTO) and system response time to disasters. In some embodiments, it has been estimated that an existing replication system that supports several hundreds of full consistency groups may be able to protect thousands of mini-CGs, thereby increasing scale tenfold.

Generally, when performing mini-CG replication, one or more replication appliances collect metadata (typically comprising an offset and a length) locally for each write operation generated by a monitored application. In certain embodiments, a snapshot may be taken comprising the data associated with each of the write operations since a prior snapshot was taken, using the metadata that was collected. In certain embodiments, the data that was written since the last transfer may be needed for the new snapshot. In some embodiments a snapshot may be triggered, for example, based on a predefined time interval and/or a predefined event. In certain embodiments, a predefined time interval may be preempted (i.e., "cut short") to improve system utilization. For example in certain embodiments, if the system detects that no consistency group is currently being transferred, the system may decide to trigger the data synchronization earlier than the predefined timer. Thus, in one exemplary implementation, after a predefined timer has expired, the one or more replication appliances transfer (or synchronize) the data associated with the collected metadata to a replica target at a second location.

Figure 1:
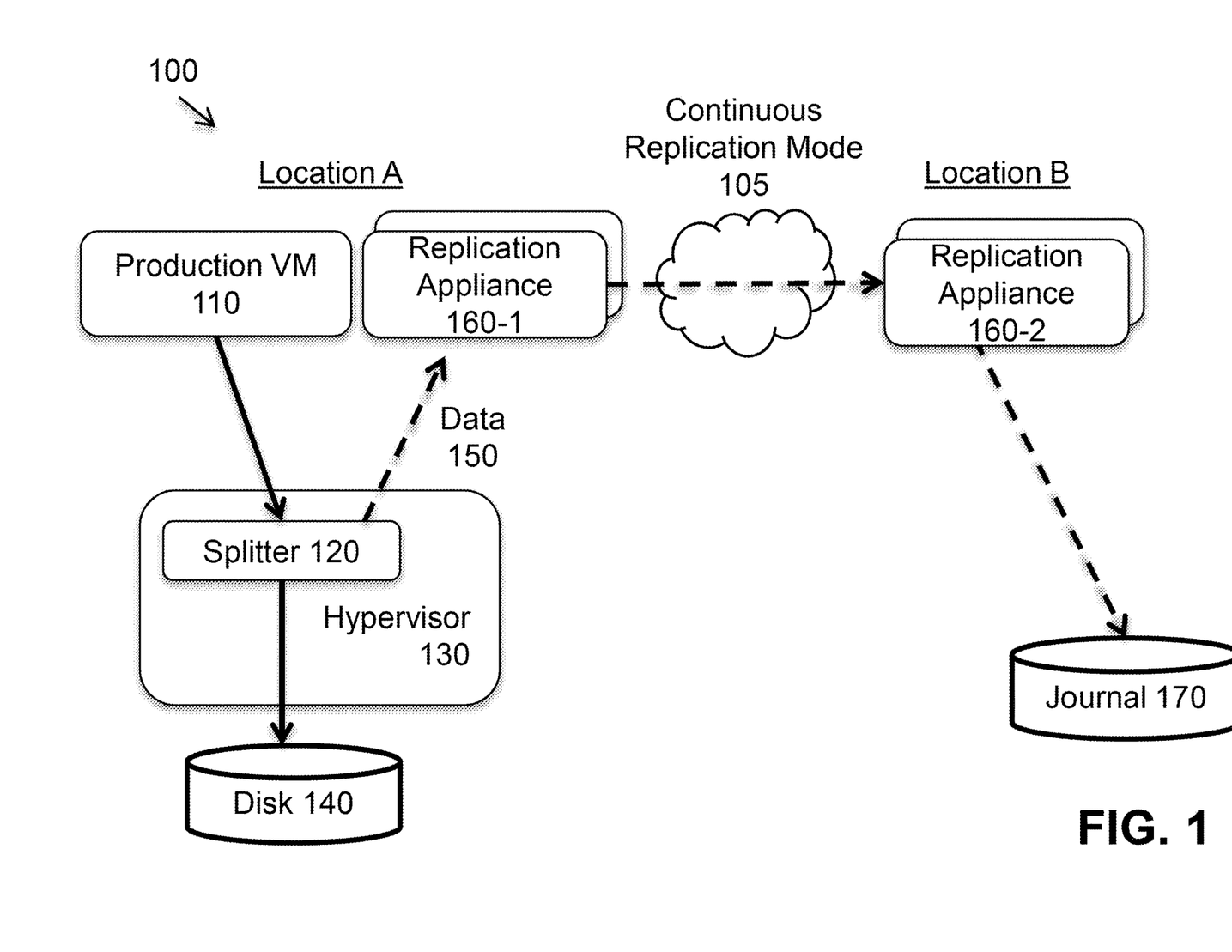
FIG. 1 illustrates a replication system configured to perform a full consistency group (CG) replication in an exemplary continuous replication mode, according to one embodiment of the disclosure.

The example embodiment of FIG. 1 illustrates a replication system 100 configured to perform a full CG replication in an exemplary continuous replication mode 105, according to one embodiment of the disclosure. As shown in FIG. 1, a production virtual machine (VM) 110 provides I/O operations to a hypervisor 130 that exposes one or more disks 140. The hypervisor 130 may be implemented, for example, using one or more VMware® ESXi purpose-built bare-metal hypervisors, commercially available from VMware, Inc. In another implementation, the disk 140 may be exposed by a storage array system.

In at least one embodiment of the disclosure, a splitter function 120 is configured in a full CG replication mode to provide the data 150 generated by the VM 110 to at least one first replication appliance 160-1 at a first location A. The data 150 comprises, for example, all of the I/O operations of the VM 110.

In an alternate implementation of the disclosure, a snapshot replication mode may be implemented, wherein periodic snapshots of the production data 150 are taken and the user will be limited to these snapshots when accessing data history. Thus, in one or more embodiments of the disclosure, a full backup of the snapshot is continuously transferred to the replica site (location B) in a continuous replication mode 105, or only the data that has been changed since the previous snapshot can be transferred to the replica site (location B) in a snapshot replication mode. In a continuous replication mode 105, the user has any-point-in-time access of the replica. The underlying storage or hypervisor infrastructure 130 can generate the snapshots and/or differences between snapshots.

Referring back to the example embodiment of FIG. 1, when the snapshot is triggered in a snapshot replication mode (e.g., based on a predefined time interval or event), the snapshot is transferred by the at least one first replication appliance 160-1 at first location A to at least one second replication appliance 160-2 at second location B, for storage in a replication journal 170. For example, one goal of data replication is for Disaster Recovery or recovery of lost and/or corrupted data or an entire application, using the replicated data stored in the replication journal 170.

The replication system 100 of FIG. 1 may be implemented, for example, using an EMC® RecoverPoint™ data protection system, commercially available from Dell EMC of Hopkinton, Mass., as modified herein to provide the selective mini-CG features and functions of the present invention.

Figure 2:
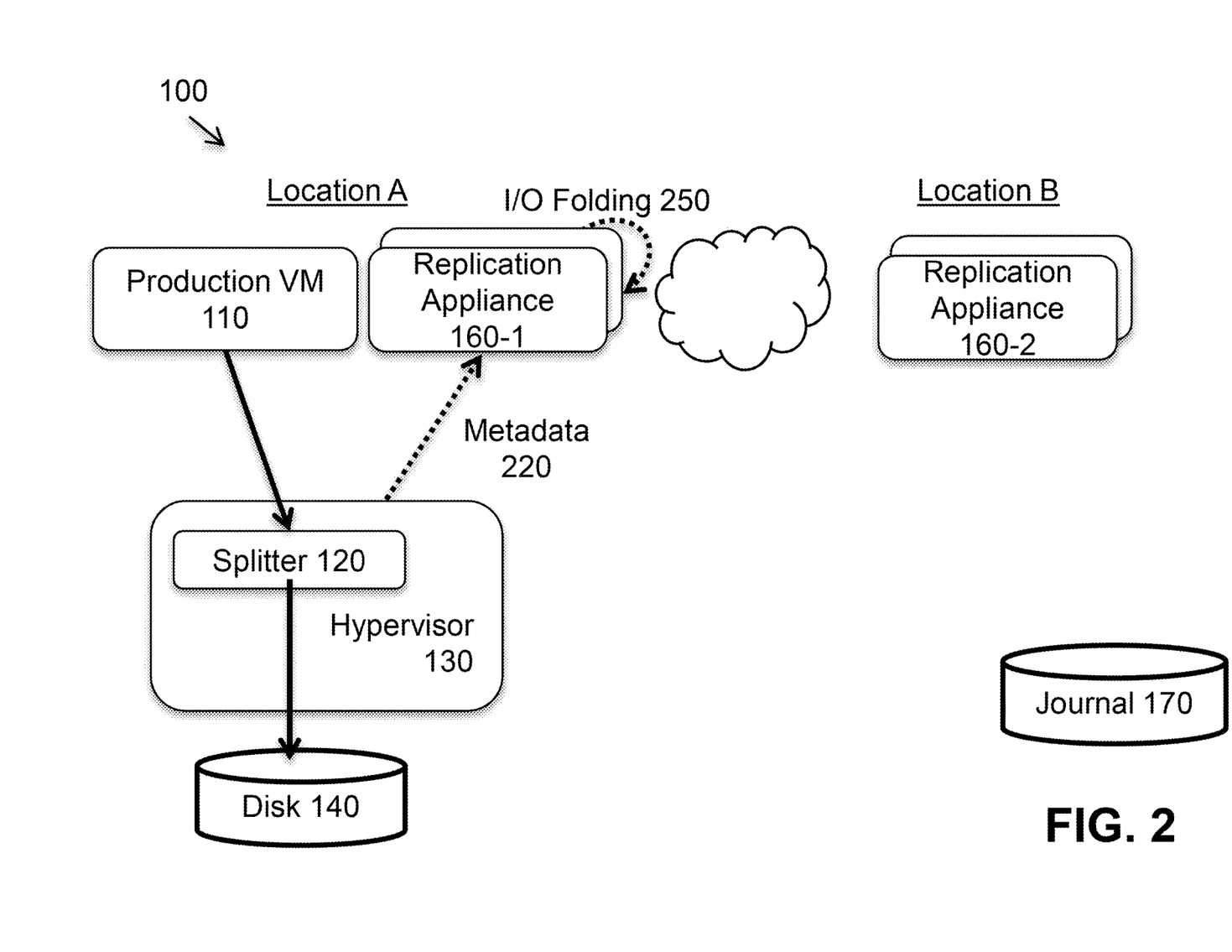
FIG. 2 illustrates the replication system of FIG. 1 configured to perform a mini-CG replication during a metadata collection phase, according to one embodiment of the disclosure.

The example embodiment of FIG. 2 illustrates the replication system 100 of FIG. 1 configured to perform a mini-CG replication during a metadata collection phase, according to one embodiment of the disclosure. As shown in FIG. 2, the production VM 110 provides I/O operations to the hypervisor 130 exposing disk 140. In at least one embodiment of the disclosure, the splitter function 120 is configured in a mini-CG mode to provide only the metadata 220 associated with the data 150 generated by the VM 110 to the at least one first replication appliance 160-1 at first location A. The metadata 220 comprises, for example, an offset and a length for each write operation generated by the VM 110. Generally, the metadata 220 identifies the data that has changed. By sending only the metadata 220 to the at least one first replication appliance 160-1, the resource requirements on the appliance are significantly reduced, in terms of incoming traffic and memory allocation.

When the snapshot is triggered (e.g., based on a predefined time interval or event), the snapshot of the changed data is transferred in one or more embodiments of the disclosure by the at least one first replication appliance 160-1 at first location A to the at least one second replication appliance 160-2 at second location B, for storage in replication journal 170.

In one exemplary implementation of the disclosure, an IO folding technique 250 is employed to replace the collected metadata 220 when a subsequent write operation overwrites a prior write operation.

It is noted that the mini-CG replication shown in FIG. 2 does not provide "any point in time" recovery or synchronous recovery point objective (RPO). Rather, replication will be of a periodic or event-based nature. Most of the time, the system 100 will obtain and save the metadata 220 of the consistency group data changes, and when a snapshot is triggered, the system 100 will replicate the changed data to the replication target.

The splitter function 120 may be implemented as a distinct module, as shown in the exemplary embodiments of FIGS. 1 and 2, or can be implemented, for example, using data change tracking functionality provided by the hypervisor 130. For example, the VMware® ESXi hypervisors referenced above provide a Changed Block Tracking (CBT) mechanism for VMFS datastores, that can be accessed by the at least one first replication appliance 160-1 to use as metadata 220 instead of the offset and length metadata described above.

As noted above, in at least one implementation, a given application and/or consistency group can dynamically switch between the full consistency group replication of FIG. 1 and the mini-CG replication of FIG. 2, based on predefined application consistency group type criteria. The predefined application consistency group type criteria comprises, for example, user-defined policies, user-defined application priorities, resource availability, consistency group performance and/or a consistency group data change rate.

Figure 3:
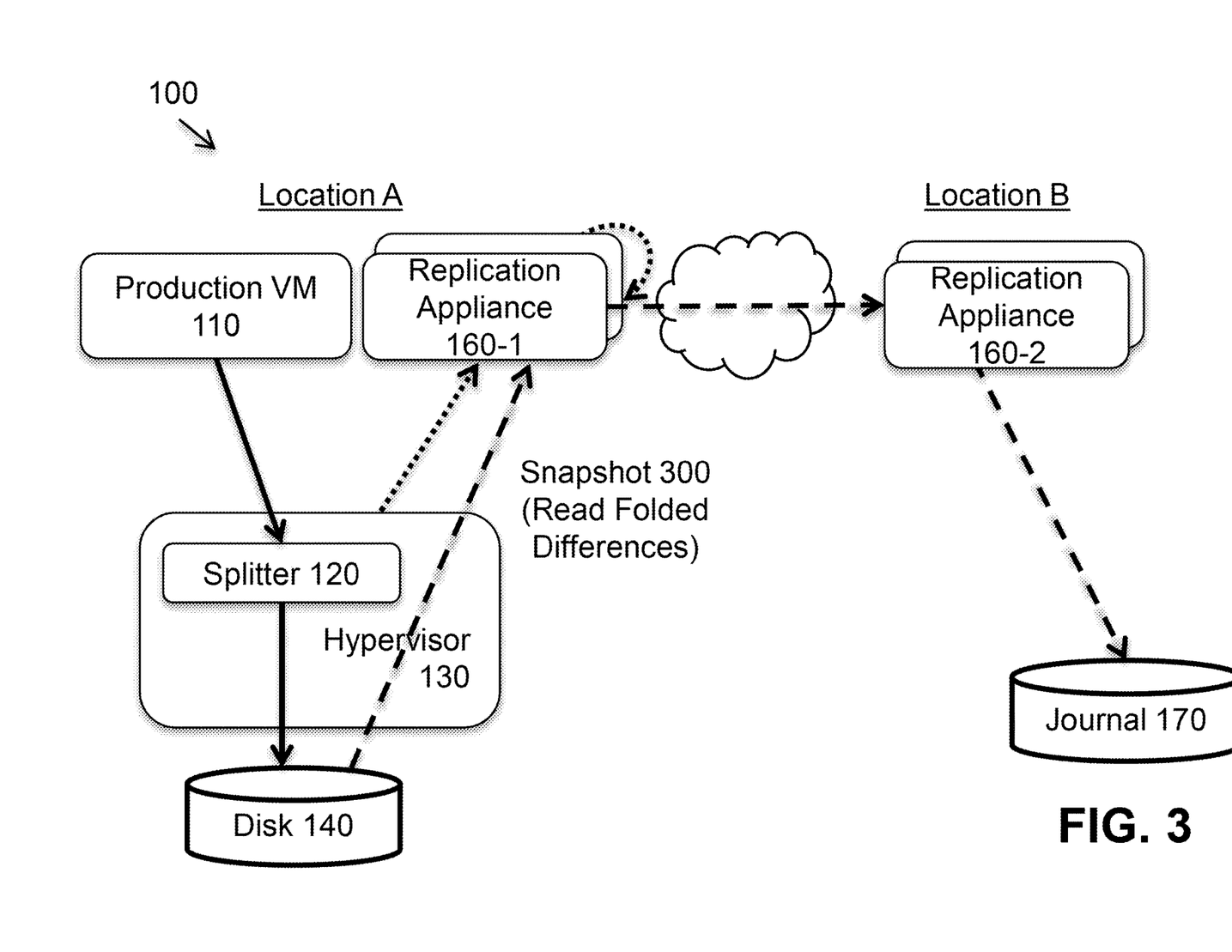
FIG. 3 illustrates the replication system of FIG. 1 configured to perform mini-CG replication during a snapshot transfer phase, according to one embodiment of the disclosure.

The example embodiment of FIG. 3 illustrates the replication system 100 of FIG. 1 configured to perform mini-CG replication during a snapshot 300 transfer phase, according to one embodiment of the disclosure. As noted above, when the snapshot is triggered (e.g., based on a predefined time interval or event), the snapshot is transferred by the at least one first replication appliance 160-1 at first location A to at least one second replication appliance 160-2 at second location B, for storage in a replication journal 170. In one or more embodiments of the disclosure, the snapshot 300 comprises the data 150 (FIG. 1) associated with each of the write operations of the VM 110 since a prior snapshot. The changed data is identified using one or more of the data 150 (FIG. 1) and the metadata 220 (FIG. 2). In the embodiment of FIG. 3, the replication appliance 160-1 reads the folded differences from the disk 140. In a further variation, described above, the hypervisor 130 can provide the changed data to the replication appliance 160-1.

Figure 4:
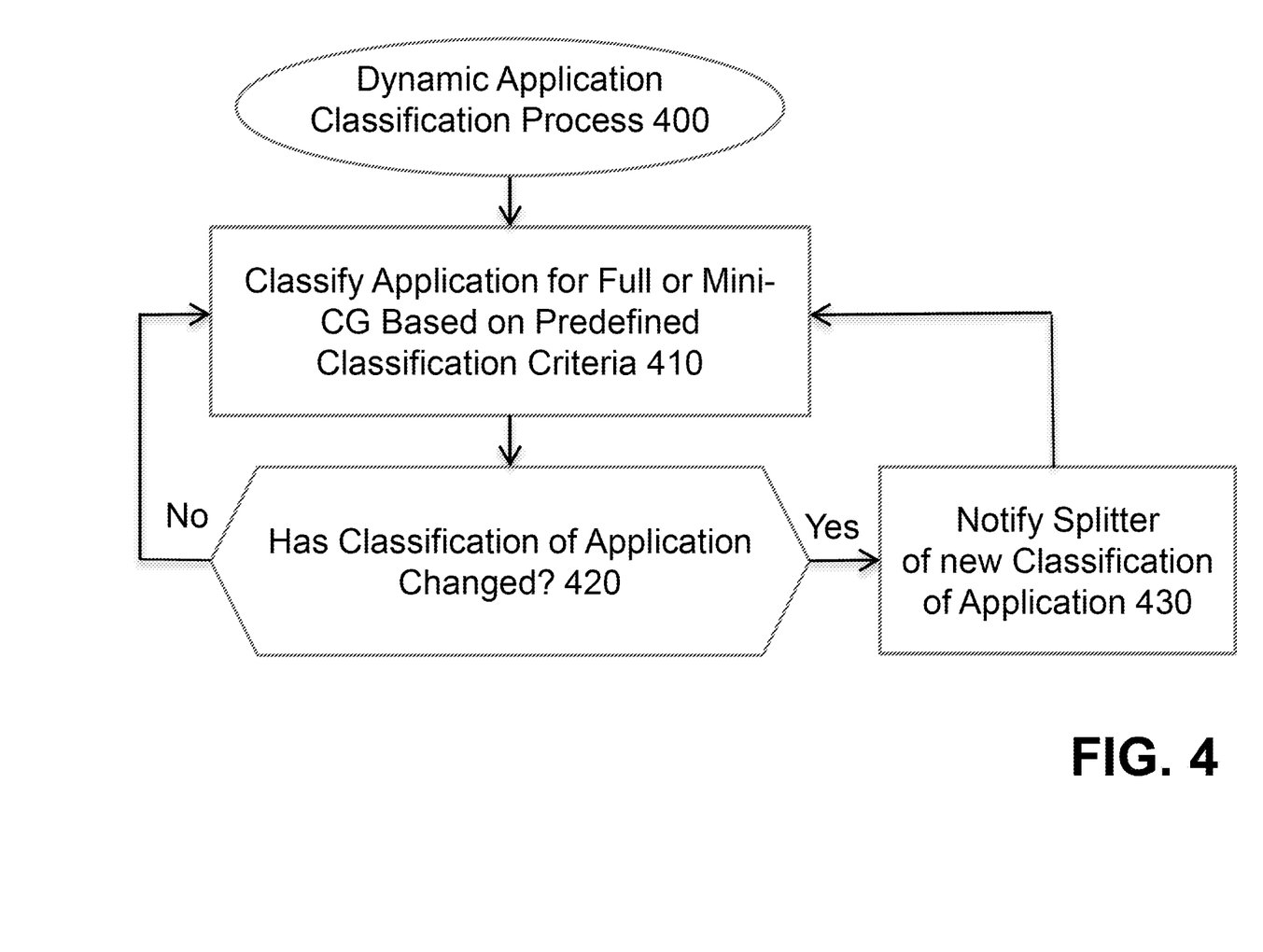
FIG. 4 is a flow chart illustrating an exemplary implementation of the dynamic application classification process 400, according to one embodiment of the disclosure.

FIG. 4 is a flow chart illustrating an exemplary implementation of the dynamic application classification process 400, according to one embodiment of the disclosure. As shown in FIG. 4, the exemplary dynamic application classification process 400 initially classifies a given application for full or mini-CG during step 410, based on the predefined application consistency group type criteria described above.

A test is performed during step 420 to determine if the classification of the application has changed. If it is determined during step 420 that the classification of the application has changed, then the splitter function 120 is notified during step 430 of the new classification of the application.

If, however, it is determined during step 420 that the classification has not changed, then program control returns to step 410.

In certain embodiments, mini-CGs may reduce the control path resources (e.g., overhead of managing the CG), by keeping reduced state and configuration information for the mini-CG and checking the state at lower frequencies, at the potential expense of a longer response time to disasters and a slower refresh rate of their state in the user interface. In certain embodiments, decision making algorithms, for example, may be be less complex, since most of the time the CG is not transferring to the replication target. In additional embodiments, since the disaster specification may be less rigid, other control path calculations are simpler and less CPU intensive, making other calculations less frequent and having to react to fewer changes in the system state.

Further, in embodiments where the metadata 220 is obtained using the data change tracking functionality provided by the hypervisor 130, the management overhead can be further reduced. Mini-CGs can also be much more agile, by "waking them up" at predefined intervals on any replication appliance 160 according to availability consideration, and avoid the need to couple the mini-CGs to a specific replication appliance 160 most of the time. Conventional replication systems invest significant effort in frequent calculations of an ongoing optimized pairing.

One or more embodiments of the present disclosure provide techniques for consistency group (CG) replication with reduced resource consumption. In at least one embodiment of the disclosure, the disclosed application replication techniques optionally generate mini-CGs offering reduced resource consumption. A given application can optionally be automatically and dynamically classified as requiring full CG replication or mini-CG replication (offering reduced resource consumption in terms of management and data-path aspects).

The foregoing applications and associated embodiments of the disclosure should be considered as illustrative only, and numerous other embodiments of the disclosure can be configured using the techniques disclosed herein, in a wide variety of different applications.

It should also be understood that the disclosed application replication techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed application replication techniques may be implemented using one or more processing platforms. One or more of the processing modules or other components may therefore each run on a computer, storage device or other processing platform element. A given such element may be viewed as an example of what is more generally referred to herein as a "processing device." A processing device can be physical or virtual and the process steps described herein may be executed across one or more physical or virtual processing devices. In addition, a given virtual device can be mapped to a portion of a physical device.

Figure 5:
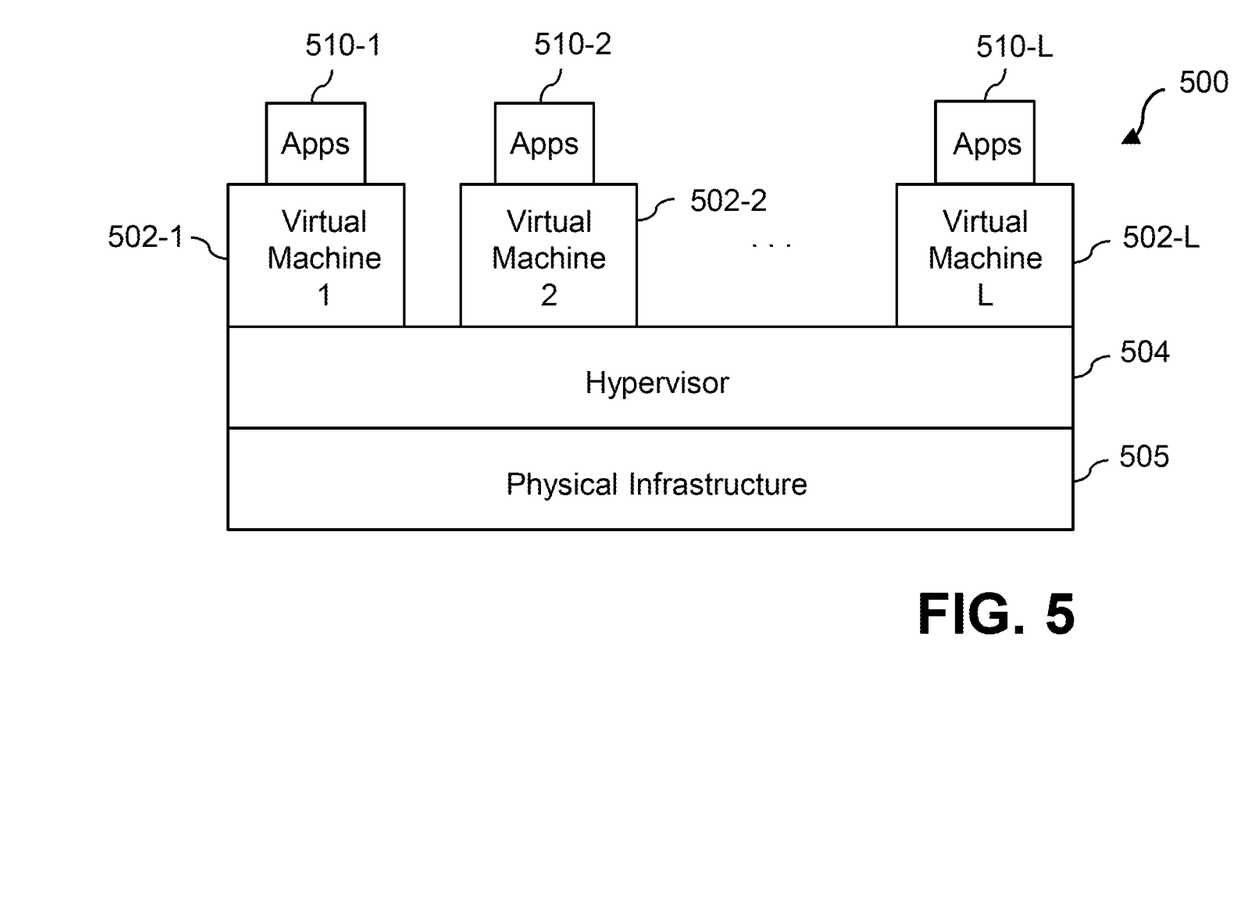
FIG. 5 illustrates an exemplary processing platform that may be used to implement at least a portion of one or more embodiments of the disclosure comprising a cloud infrastructure.

Referring now to FIG. 5, one possible processing platform that may be used to implement at least a portion of one or more embodiments of the disclosure comprises cloud infrastructure 500. The cloud infrastructure 500 in this exemplary processing platform comprises virtual machines (VMs) 502-1, 502-2, . . . 502-L implemented using a hypervisor 504.

The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of client, servers, controllers, or computing devices in the system.

Although only a single hypervisor 504 is shown in the embodiment of FIG. 5, the system may of course include multiple hypervisors each providing a set of virtual machines using at least one underlying physical machine.

An example of a commercially available hypervisor platform that may be used to implement hypervisor 504 and possibly other portions of the system in one or more embodiments of the disclosure is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from Dell EMC of Hopkinton, Mass. A variety of other storage products may be utilized to implement at least a portion of the system.

In some embodiments of the disclosure, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments of the disclosure a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 6:
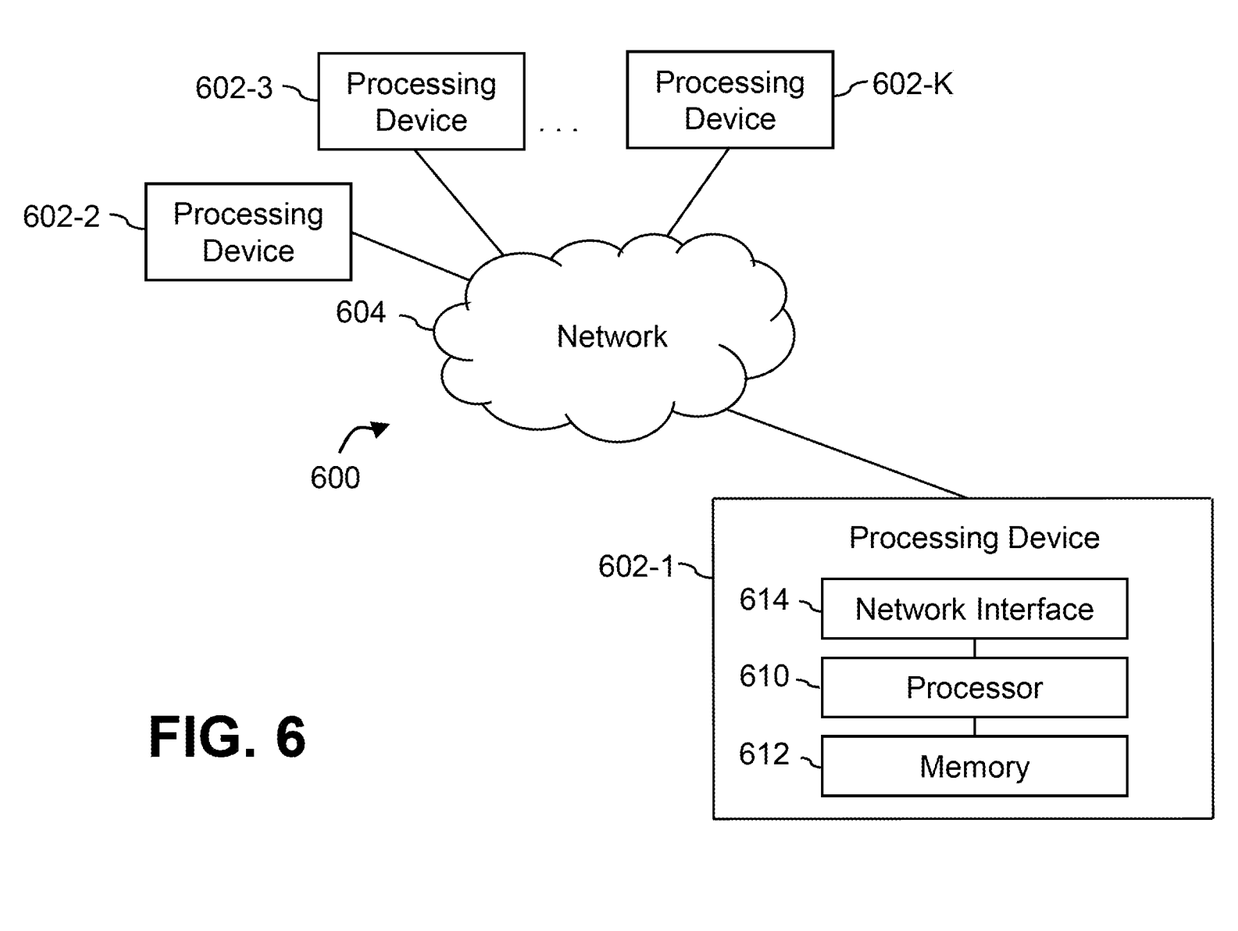
FIG. 6 illustrates another exemplary processing platform that may be used to implement at least a portion of one or more embodiments of the disclosure.

Another example of a processing platform is processing platform 600 shown in FIG. 6. The processing platform 600 in this embodiment of the disclosure comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "computer program product" having executable computer program code embodied therein, may comprise random access memory (RAM), read only memory (ROM) or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the disclosure are presented for purposes of illustration only. Many variations and other alternative embodiments of the disclosure may be used. For example, the disclosed application replication techniques are applicable to a wide variety of other types of communication systems, storage systems and processing devices. Accordingly, the particular illustrative configurations of system and device elements detailed herein can be varied in other embodiments of the disclosure. These and numerous other alternative embodiments of the disclosure within the scope of the appended claims will be readily apparent to those skilled in the art.

What is claimed is:

1. A method, comprising:

obtaining, by one or more first replication appliances at a first location in a first mode, metadata for each write operation generated by a monitored application from a splitter function, without obtaining data for each of said write operations generated by said monitored application, wherein at least one of said first replication appliances comprises at least one processing device coupled to a memory, and wherein the splitter function: (a) obtains the metadata for each write operation generated by said monitored application from one or more of (i) a plurality of storage units of the monitored application and (ii) a plurality of virtual machines of the monitored application and (b) provides said metadata for each of said write operations generated by said monitored application, without providing the data associated with each of said write operations, to said one or more first replication appliances;

obtaining, by one or more of said first replication appliances in a second mode, a snapshot comprising the data associated with each of said write operations since a prior snapshot based on said metadata, wherein said splitter function provides said data or said metadata to said one or more first replication appliances based on a dynamic determination of whether said monitored application requires replication: (i) using said data in said second mode, or (i) using said metadata in said first mode, wherein the dynamic determination is based on one or more predefined application consistency group type criteria; and providing said snapshot or said metadata, based at least in part on the dynamic determination, to one or more second replication appliances at a different location than said first location for storage in a replication journal.

2. The method of claim 1, further comprising the step of replacing said metadata when a subsequent write operation overwrites a prior write operation.

3. The method of claim 1, wherein said metadata is generated by one or more of said splitter function that writes said write operations to a disk exposed by one or more of a hypervisor and a storage array system.

4. The method of claim 3, further comprising the step of storing said metadata by said splitter function for fault tolerance.

5. The method of claim 1, wherein said metadata comprises a disk identifier.

6. The method of claim 1, wherein a consistency group of the monitored application comprises one or more of a plurality of storage units of the monitored application and a plurality of virtual machines of the monitored application.

7. The method of claim 1, wherein said snapshot is obtained based on one or more of a predefined time period and a predefined event.

8. The method of claim 1, wherein said data associated with each of said write operations since a prior snapshot is generated by one or more disks storing said data based on said metadata.

9. The method of claim 1, wherein said metadata comprises an offset and a length for each of said write operations.

10. The method of claim 1, wherein said predefined application consistency group type criteria comprises one or more of user-defined policies, user-defined application priorities, resource availability, consistency group performance and a consistency group data change rate.

11. A computer program product, comprising a non-transitory machine-readable storage medium having encoded therein executable code of one or more software programs, wherein the one or more software programs when executed by at least one processing device perform the following steps:

obtaining, by one or more first replication appliances at a first location in a first mode, metadata for each write operation generated by a monitored application from a splitter function, without obtaining data for each of said write operations generated by said monitored application, wherein at least one of said first replication appliances comprises at least one processing device coupled to a memory, and wherein the splitter function: (a) obtains the metadata for each write operation generated by said monitored application from one or more of (i) a plurality of storage units of the monitored application and (ii) a plurality of virtual machines of the monitored application and (b) provides said metadata for each of said write operations generated by said monitored application, without providing the data associated with each of said write operations, to said one or more first replication appliances;

obtaining, by one or more of said first replication appliances in a second mode, a snapshot comprising the data associated with each of said write operations since a prior snapshot based on said metadata, wherein said splitter function provides said data or said metadata to said one or more first replication appliances based on a dynamic determination of whether said monitored application requires replication: (i) using said data in said second mode, or (i) using said metadata in said first mode, wherein the dynamic determination is based on one or more predefined application consistency group type criteria; and providing said snapshot or said metadata, based at least in part on the dynamic determination, to one or more second replication appliances at a different location than said first location for storage in a replication journal.

12. A system, comprising:
a memory; and
at least one hardware device, coupled to the memory, operative to implement the following steps:

obtaining, by one or more first replication appliances at a first location in a first mode, metadata for each write operation generated by a monitored application from a splitter function, without obtaining data for each of said write operations generated by said monitored application, wherein at least one of said first replication appliances comprises at least one processing device coupled to a memory, and wherein the splitter function: (a) obtains the metadata for each write operation generated by said monitored application from one or more of (i) a plurality of storage units of the monitored application and (ii) a plurality of virtual machines of the monitored application and (b) provides said metadata for each of said write operations generated by said monitored application, without providing the data associated with each of said write operations, to said one or more first replication appliances; obtaining, by one or more of said first replication appliances in a second mode, a snapshot comprising the data associated with each of said write operations since a prior snapshot based on said metadata, wherein said splitter function provides said data or said metadata to said one or more first replication appliances based on a dynamic determination of whether said monitored application requires replication: (i) using said data in said second mode, or (i) using said metadata in said first mode, wherein the dynamic determination is based on one or more predefined application consistency group type criteria; and providing said snapshot or said metadata, based at least in part on the dynamic determination, to one or more second replication appliances at a different location than said first location for storage in a replication journal.

13. The system of claim 12, further comprising the step of replacing said metadata when a subsequent write operation overwrites a prior write operation.

14. The system of claim 12, wherein said metadata is generated by one or more of said splitter function that writes said write operations to a disk exposed by one or more of a hypervisor and a storage array system.

15. The system of claim 14, further comprising the step of storing said metadata by said splitter function for fault tolerance.

16. The system of claim 12, wherein said metadata comprises one or more of an offset, a length and a disk identifier for each of said write operations.

17. The system of claim 12, wherein a consistency group of the monitored application comprises one or more of a plurality of storage units of the monitored application and a plurality of virtual machines of the monitored application.

18. The system of claim 12, wherein said snapshot is obtained based on one or more of a predefined time period and a predefined event.

19. The system of claim 12, wherein said data associated with each of said write operations since a prior snapshot is generated by one or more disks storing said data based on said metadata.

20. The system of claim 12, wherein said predefined application consistency group type criteria comprises one or more of user-defined policies, user-defined application priorities, resource availability, consistency group performance and a consistency group data change rate.

* * * * *